(12) United States Patent
Hiroaki et al.

(10) Patent No.: US 7,291,426 B2
(45) Date of Patent: Nov. 6, 2007

(54) MANUFACTURING METHOD OF COLOR FILTER

(75) Inventors: Nishikubo Hiroaki, Kyoto (JP); Omoto Koichi, Kyoto (JP); Fujimoto Yoshihiro, Kyoto (JP)

(73) Assignee: Dainippon Screen Mgf. Co., Ltd., Kyoto (JP)

( * ) Notice: Subject to any disclaimer, the term of this patent is extended or adjusted under 35 U.S.C. 154(b) by 113 days.

(21) Appl. No.: 11/359,487

(22) Filed: Feb. 23, 2006

(65) Prior Publication Data

US 2006/0188795 A1 Aug. 24, 2006

(30) Foreign Application Priority Data

Feb. 24, 2005 (JP) ............................. 2005-48404

(51) Int. Cl.
*G02B 5/20* (2006.01)
(52) U.S. Cl. .......................................................... 430/7
(58) Field of Classification Search ...................... None
See application file for complete search history.

(56) References Cited

U.S. PATENT DOCUMENTS

2006/0045966 A1* 3/2006 Suzuki et al. ............... 427/164

FOREIGN PATENT DOCUMENTS

| CN | 1517727 A | 8/2004 |
|---|---|---|
| JP | 63-235901 A | 9/1988 |
| JP | 6-174913 A * | 6/1994 |
| JP | 10-236516 A * | 9/1998 |
| JP | 11-142641 | 5/1999 |
| JP | 2000-12217 A | 1/2000 |
| JP | 2002-75640 A | 3/2002 |

* cited by examiner

*Primary Examiner*—John A. McPherson
(74) *Attorney, Agent, or Firm*—McDermott Will & Emery LLP (57) ABSTRACT

A manufacturing method of a color filter is capable of achieving improvement in efficiency of use of materials and simplification in process, and forming highly accurate colored patterns.

The manufacturing method includes the steps of: continuously discharging a coloring matter from a nozzle to apply the coloring mater to between the banks 12 on the glass substrate while, with a nozzle being scanned with respect to a glass substrate 10 on which surface a predetermined pattern of light-blocking bank 12 is formed, intermittently feeding the glass substrate at a predetermined pitch in a direction orthogonal to the scanning direction; aligning and superimposing on the backside of the glass substrate a mask plate in which a light transmission part corresponding to an active region of a color filter is formed, and exposing the glass substrate to light from backside through the mask plate to cause a coloring matter having been applied at a part corresponding to an active region of the color filter to be cured; and developing the surface side of the glass substrate to dissolve and remove the uncured coloring matter having been applied at a part corresponding to the non-active region of a color filter.

2 Claims, 7 Drawing Sheets

MANUFACTURING METHOD OF COLOR FILTER

BACKGROUND OF THE INVENTION

1. Field of the Invention

The present invention relates to a method for manufacturing a color filer for use in, e.g., color liquid crystal displays, organic EL (electro luminescence) display units, or FED (filed emission displays).

2. Description of the Related Art

A color filter of, for example, color liquid crystal displays has been conventionally manufactured by such methods as staining in which a staining base material having photosensitivity is applied onto a transparent substrate, the staining base material is exposed to light through a photo-mask to develop, and the staining base material having been formed in a predetermined pattern is stained to be a colored layer; pigment dispersion in which a photosensitive resist in which coloring pigments have preliminarily been dispersed is applied onto a transparent substrate, and the photosensitive resist is exposed to light through a photo-mask and developed to form a predetermined pattern of colored layer; or printing in which using the printing technique, printing inks are directly applied onto a transparent substrate in a predetermined pattern by, e.g., ink-jet printing to obtain a colored layer as disclosed in, for example, the Japanese Patent Publication (unexamined) No. 235901/1988.

SUMMARY OF THE INVENTION

In the method of manufacturing a color filter by the method of staining or pigment dispersion, material loss is inevitable in the process of applying a staining base material having photosensitivity or a photo-sensitive resist onto a transparent substrate by, e.g., spin coating; and moreover it is necessary to repeat the development process or the cleaning process every time colored patterns of each color of red, green and blue are formed. Like this, efficiency of use of materials is low and the process is complicated, which is one of main causes of high cost of liquid crystal displays. Whereas, in the printing method, a problem exists in that highly accurate colored patterns are hard to form.

The present invention was made in view of the state of arts as described above, and has an object of providing a manufacturing method of a color filter by which it is possible to achieve improvement in efficiency of use of materials and simplification of process, eventually making it possible to form highly accurate colored patterns.

A manufacturing method of a color filter according to claim 1, in which coloring matters are applied onto a transparent substrate on the surface of which a predetermined pattern of light-blocking bank functioning as a black matrix is preliminarily formed, comprises the steps of: continuously discharging a coloring matter having photosensitivity from a nozzle to apply the coloring mater to between light-blocking banks on the transparent substrate while, with a nozzle being scanned with respect to the mentioned transparent substrate, causing the transparent substrate and the nozzle to move intermittently at a predetermined pitch relatively in a direction orthogonal to a direction scanning thereof; aligning and superimposing a mask, in which a light transmission part corresponding to an active region of a color filter is preliminarily formed, on the backside of the mentioned transparent substrate, and exposing the transparent substrate to light from the backside through this mask to cause the coloring matter having been applied to a part corresponding to an active region of the color filter to be cured; and developing a surface side of the mentioned transparent substrate to dissolve and remove an uncured coloring matter having been applied at a part corresponding to the non-active region of the color filter, and the uncured coloring matter having been applied onto the mentioned light-blocking bank.

The invention according to claim 2 is the manufacturing method according to claim 1, and in which at least a surface of the mentioned light-blocking bank has liquid-repellent properties with respect to the coloring matter.

In the manufacturing method of a color filter of the invention according to claim 1, coloring matters are just discharged continuously from a nozzle onto a transparent substrate on which light-blocking banks are formed, so that material loss is suppressed to be low. Further, to form a pattern of coloring matters, no process of exposure, development, or cleaning is needed. Furthermore, the coloring matters are applied to between the light-blocking banks, so that it is possible to make the highly accurate application of coloring matters. In addition, out of the coloring matters having been continuously discharged from the nozzle to be applied onto the transparent substrate, unnecessary coloring matters having been applied at a part corresponding to the non-active region of the color filter, and unnecessary coloring matters having been applied onto the light-blocking banks are removed from the transparent substrate by exposure from backside of the transparent substrate and by development on the front side. Thus, there is no application of coloring matters at the non-active part on the transparent substrate.

As a result, in case of employing the manufacturing method of a color filter of the invention according to claim 1, it is possible to achieve improvement in efficiency of use of materials and simplification of process, and to form highly accurate colored patterns.

In the manufacturing method of a color filter according to claim 2 of the invention, it is possible to reliably prevent mixing of colors caused by that coloring matters overflow the light-blocking banks in the application process of coloring matters.

DESCRIPTION OF THE PREFERRED EMBODIMENTS

Several preferred embodiments of the present invention are hereinafter described referring to the drawings.

FIGS. 1 through 10 shows one preferred embodiment of the invention, and are views for explaining each step of the manufacturing method of a color filter.

Figure 1:
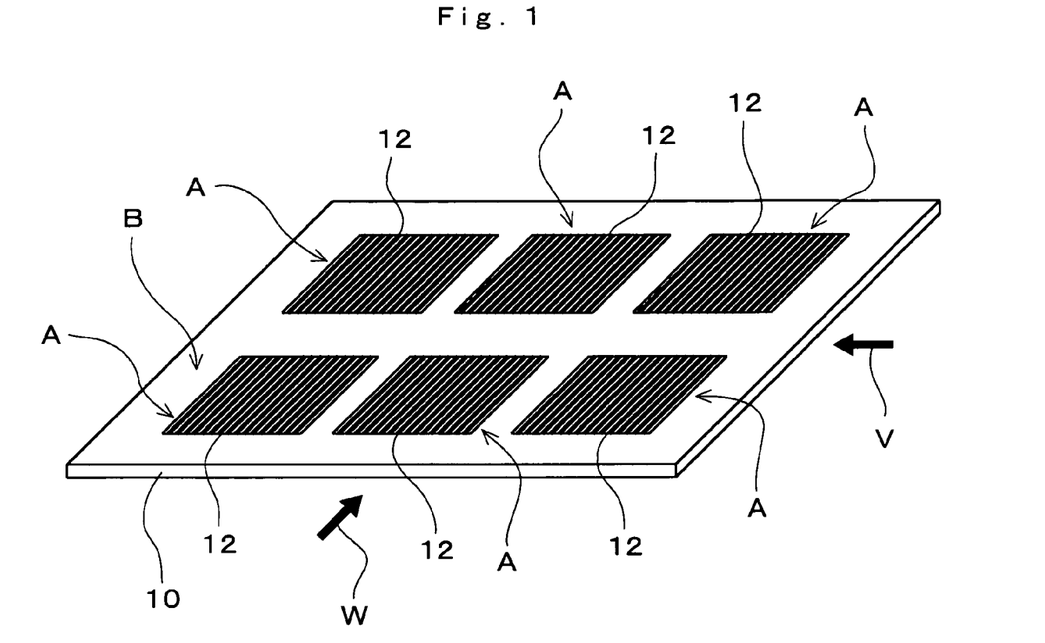
FIG. 1 shows one of preferred embodiments according to the present invention for explaining the process in the manufacturing method of a color filter, and is a schematic perspective view showing the state in which banks are formed on a glass substrate.
Figure 2:
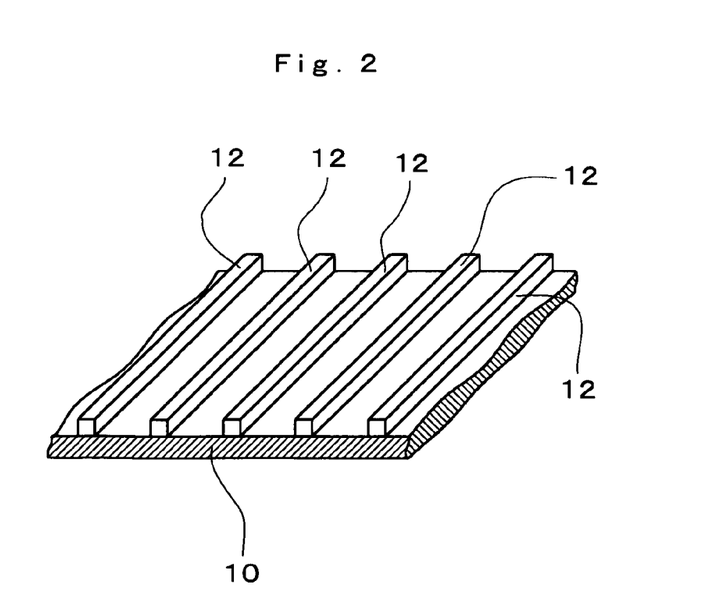
FIG. 2 is a partially perspective view of a part of the glass substrate shown in FIG. 1 being enlarged.
Figure 3:
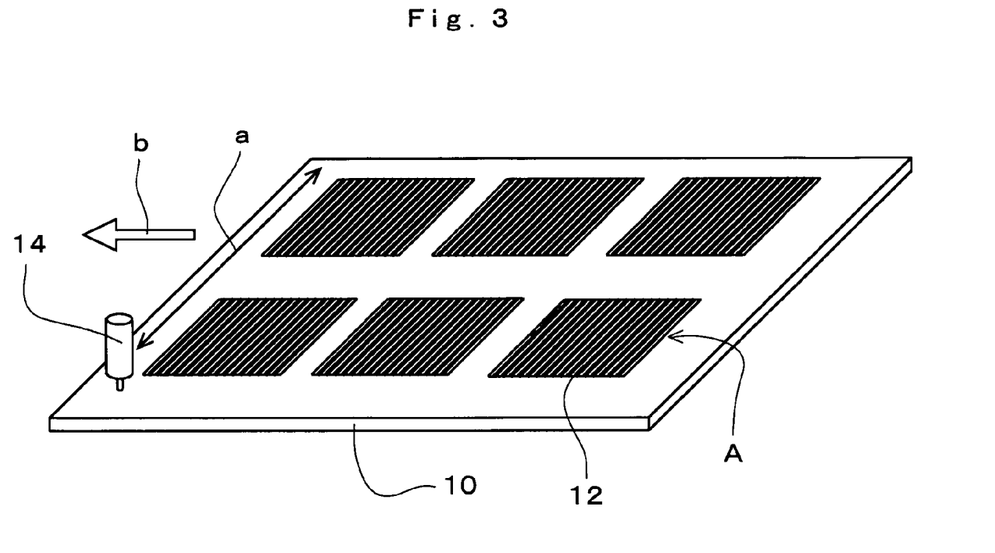
FIG. 3 is a view for explaining the process in the manufacturing method of a color filter, and is a schematic perspective view showing the state of applying a coloring matter onto the surface of the glass substrate.
Figure 4:
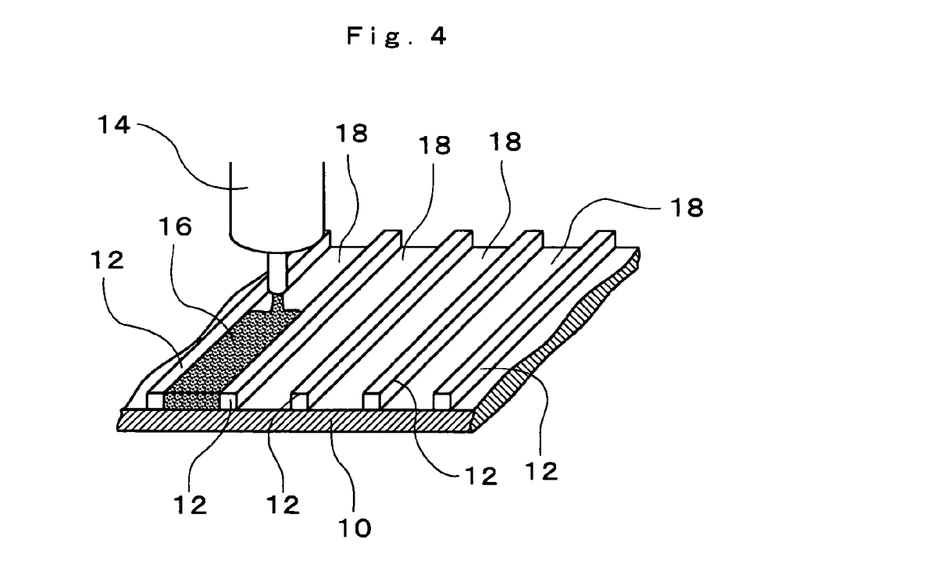
FIG. 4 is likewise a partially enlarged perspective view showing the state of applying a coloring matter onto the glass substrate.

Prior to manufacturing a color filter, first light-blocking banks of a predetermined pattern are formed on a transparent substrate, for example, a transparent glass substrate. FIG. 1 is a schematic perspective view showing the state in which banks are formed on the glass substrate, and FIG. 2 is a partial perspective view of a part thereof being enlarged. FIG. 1 shows an example of having six screens in which six active regions A are provided corresponding to the active parts of a color filter.

A bank 12 is a member functioning as a black matrix in the color filter, and is made of light-blocking material. For example, this bank 12 is formed by applying a photosensitive resin material onto the surface of a glass substrate 10, and exposing the photosensitive polymeric film to light through a photo-mask to be developed to manufacture in a predetermined pattern, being in a striped pattern in this example. It is desirable that at least the surface of the bank 12 is liquid-repellent with respect to pigment dispersion-type material (coloring matter) as described later. A method for obtaining liquid-repellent properties includes the step of: forming a bank 12 itself with the use of a photo-sensitive resin material having liquid-repellent properties, or forming a bank 12 with the use of a photo-sensitive resin material (having no liquid-repellent properties); and thereafter applying an ink-repellent matter onto the surface thereof to deposit and form a liquid-repellent film. As material of forming a liquid-repellent film, it is desirable to employ a resin material including at least one of silicon and fluorine. It is preferable to use, for example, a silicon resin or a fluorine resin. By making a bank 12 liquid-repellent as described above, it is possible to reliably prevent the mixing of colors caused by the fact that coloring matters overflow the banks 12.

Next, using the below-described manufacturing apparatus, a color filter is formed on a glass substrate 10 on which the light-blocking banks 12 have preliminarily been made. First, pigment dispersion-type materials (coloring matters) of each color that are obtained by causing each of coloring pigments of read, green and blue to disperse in respective resin base materials (negative-type resists) having photosensitivity are applied to the surface of the glass substrate 10 respectively. That is, as shown in a schematic perspective view of FIG. 3, while with a nozzle 14 scanned in a direction indicated by the arrow "a" with respect to the glass substrate 10, the glass substrate 10 and the nozzle 14 are intermittently moved relatively at a predetermined pitch in a direction indicated by the arrow "b" orthogonal to the scanning direction thereof, a coloring matter 16 is continuously discharged from the nozzle 14 to be applied in an elongated groove 18 formed between the adjacent banks 12 on the glass substrate 10, as shown in a partially enlarged perspective view of FIG. 4. In the example shown, the position in a direction indicated by the arrow "b" orthogonal to the foregoing scanning direction of the nozzle 14 is fixed, and the glass substrate 10 is intermittently fed in the direction indicated by arrow "b". A pitch of the intermittent feed of the glass substrate 10 in the direction indicated by arrow "b" is to be [width dimension of a bank 12+width dimension of the elongated groove 18]×3, for example, when one color of coloring matter is discharged from one nozzle 14 in one scanning step, or three nozzles 14 that discharge three colors of coloring matters into respective elongated grooves 18 adjacent to each other are simultaneously scanned. In this respect, one scanning means that a nozzle 14 moves from one end to the other end of a glass substrate 10. The nozzle 14 makes one reciprocating motion upon two times of scanning operation. Further, the glass substrate 10 is fed intermittently by one pitch at each time of one scanning of the nozzle 14. The scanning of the nozzle 14 is made at high speed, for example, approximately 3 m/sec., while discharge rate of a coloring matter 16 from the nozzle 14 is a very small, for example, 80 μl/min to 250 μl/min.

Figure 5:
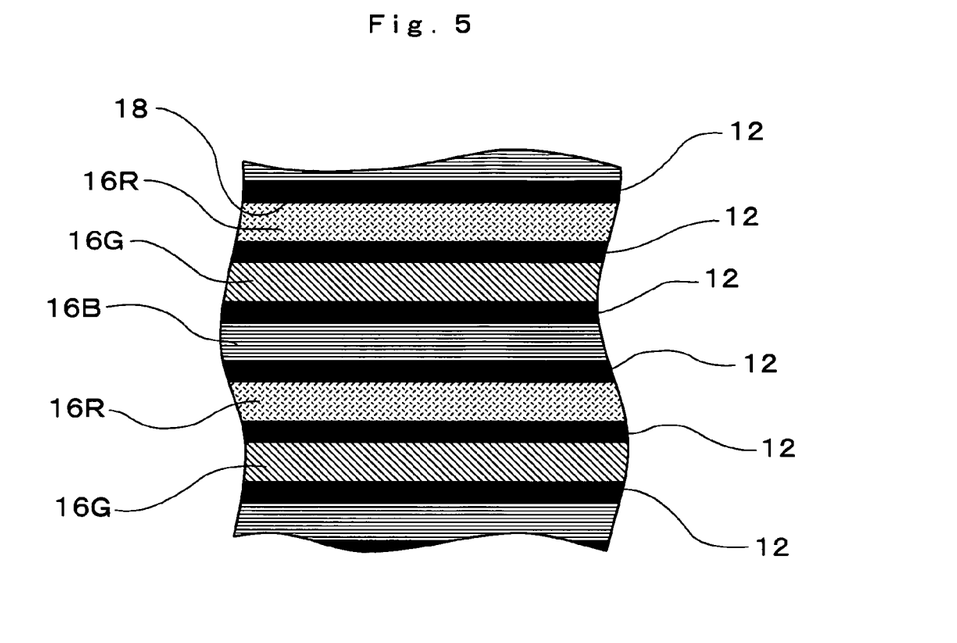
FIG. 5 is likewise a partially enlarged plan view showing the state in which coloring matters are applied onto the surface of the glass substrate.
Figure 6:
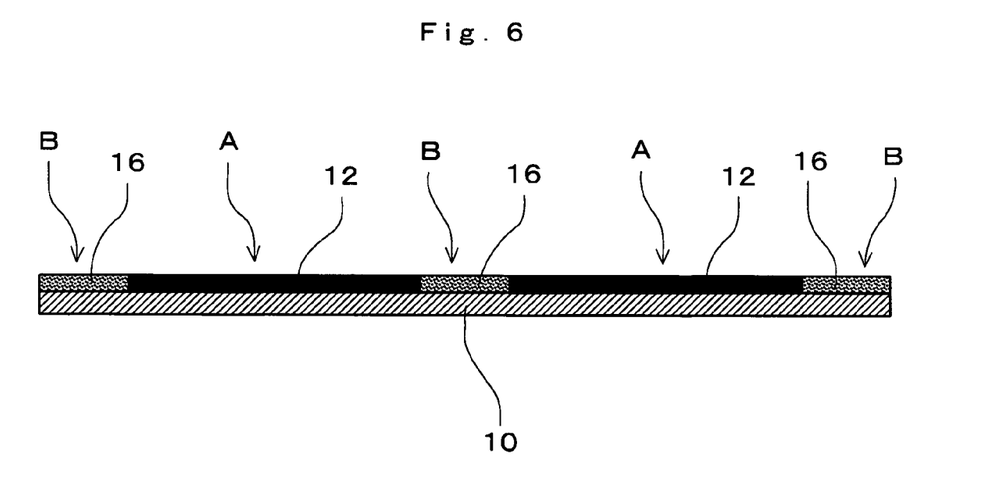
FIG. 6 is likewise a longitudinal cross section showing the state in which the coloring matters are applied and adhered onto the non-active region of the glass substrate.

In the process of applying coloring matters as described above, striped pattern of application parts of coloring matters 16R, 16G, and 16B of respective colors of red, green and blue, and banks 12 having light-blocking effect are formed in an active region A of the glass substrate 10, as shown in a partially enlarged plan view of FIG. 5. On the other hand, the nozzle 14 is scanned at high speed, and coloring matters are continuously discharged from the nozzles 14, so that, as shown in FIG. 6, each color of coloring matters 16 is applied and adhered also into a non-active region B of the glass substrate 10 as well. FIG. 6 is a longitudinal section of the glass substrate 10 taken in a direction indicated by arrow V in FIG. 1. After this application process, the coloring matters 16R, 16G, and 16B having been applied onto the glass substrate 10 are subjected to baking.

Figure 7:
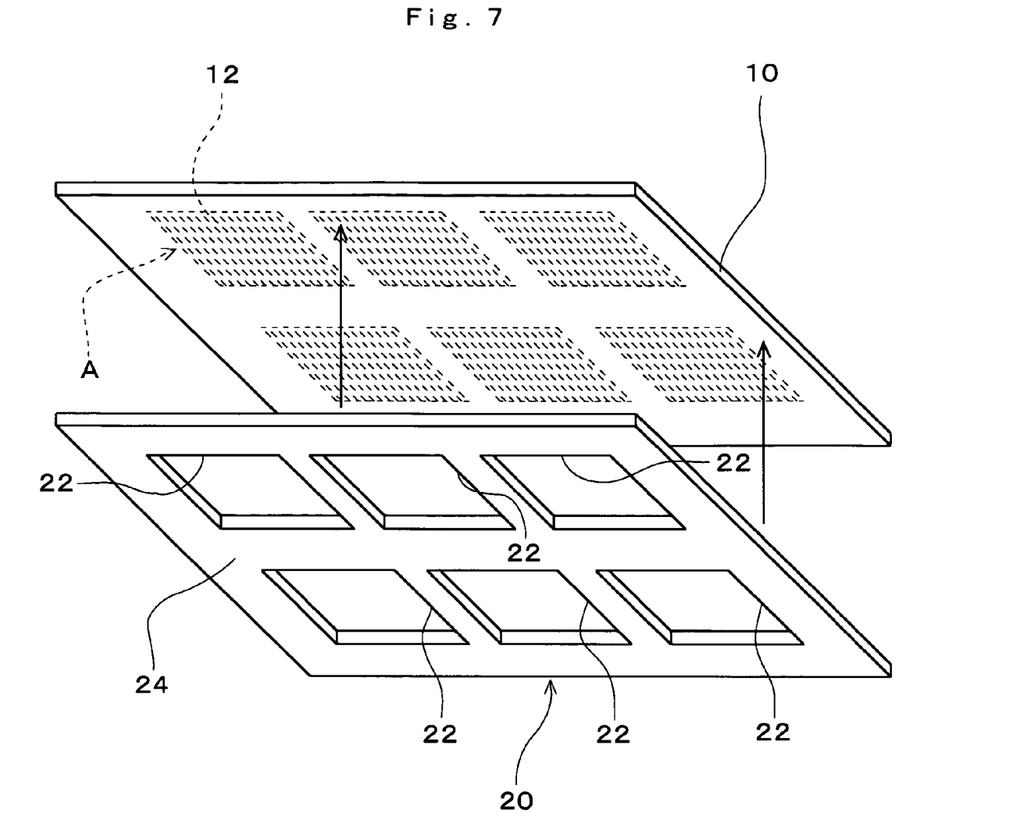
FIG. 7 is likewise a view showing the state in which a mask plate is aligned on the backside of the glass substrate to be superimposed, and is a schematic perspective view taken from the backside of the glass substrate.
Figure 8:
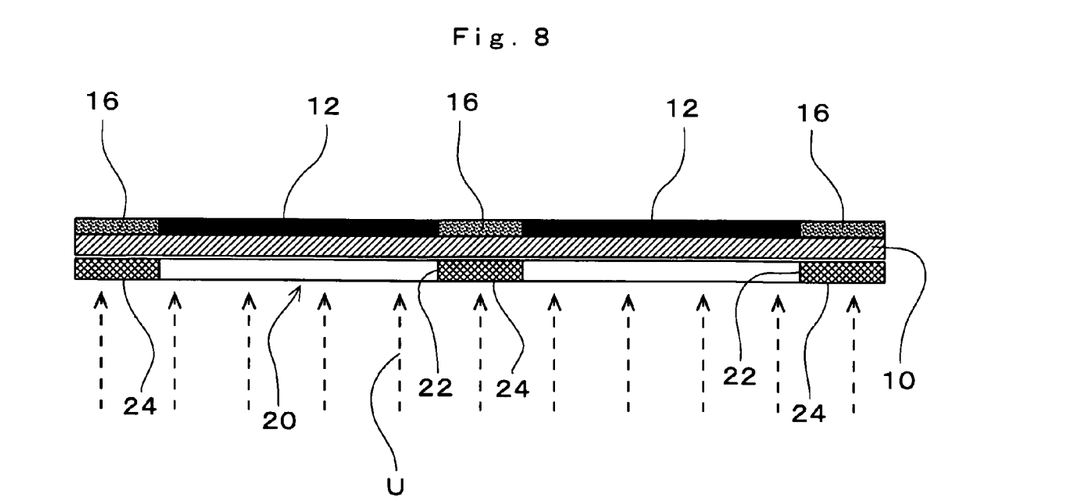
FIG. 8 is likewise a longitudinal cross section showing the state in which the glass substrate is exposed to light through a mask plate from the backside.

Subsequently, as shown in FIG. 7 being a schematic perspective view of a glass substrate 10 taken from the backside, a mask plate 20 is aligned and superimposed on the backside of the glass substrate 10, and a light U such as ultraviolet radiation is applied from the backside of the glass substrate 10 via the mask plate 20 as shown in a longitudinal section of FIG. 8. Light transmission openings 22 are formed in the mask plate 20, corresponding to the active parts (active regions A of the glass substrate 10) of a color filter. A part other than the light transmission openings 22, that is, a part corresponding to the non-active part (non-active region B of the glass substrate 10) is a light-blocking surface 24. This mask plate 20 is aligned using alignment marks (not shown) and superimposed on the backside of the glass substrate 10, and thereafter exposed to light. As a result, the coloring matters 16 having been applied onto the active region A of the glass substrate 10 are photo-cured. Whereas, the coloring matters 16 having been applied onto the non-active region B of the glass substrate 10 are shielded from light with the light-blocking surface 24 of the mask plate 20, so that they are not exposed to light, and remain uncured.

Figure 9:
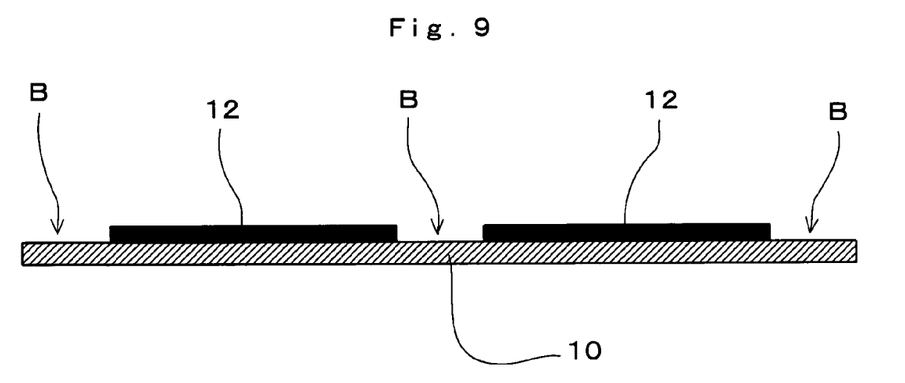
FIG. 9 is likewise a longitudinal cross section showing the state in which the surface side of the glass substrate is developed, and the uncured coloring matters having been applied in the non-active region of the glass substrate are dissolved and removed.
Figure 10:
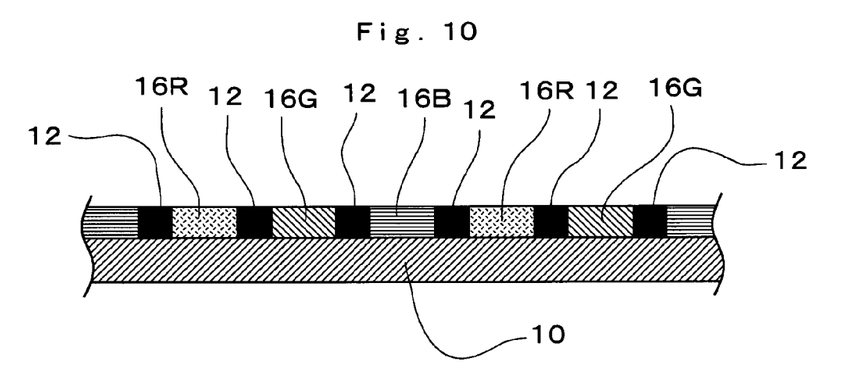
FIG. 10 is likewise a partially enlarged longitudinal cross section showing the state in which coloring matters remain in the active region of the glass substrate after the development process.
Figure 11:
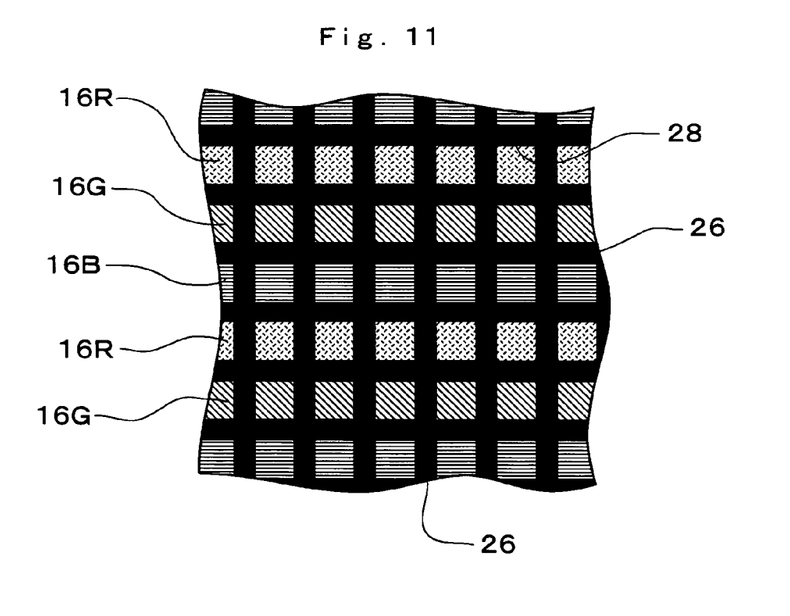
FIG. 11 shows another embodiment according to the invention, and is a partially enlarged plan view showing the state in which coloring matters are applied on the surface of a glass substrate.

Subsequently to the exposure process, the surface side of the glass substrate 10 is developed. By this development, the coloring matters 16 having been applied to the non-active region B of the glass substrate 10 as shown in FIG. 6 are dissolved and removed as shown in FIG. 9, and a glass surface in the non-active region B will be exposed. In addition, even if the coloring matters adhere partially to the surface of banks 12 in the active region A of the glass substrate 10 in the application process of coloring matters, those coloring matters on the banks 12 are shielded from light with the banks 12 having light-blocking effect in the exposure process, so that they are not exposed to light, and remain uncured. Therefore, in the development process, the coloring matters on the banks 12 are dissolved and removed. On the other hand, as shown in FIG. 10 being a partially enlarged longitudinal sectional view taken in a direction indicated by the arrow W orthogonal to the direction indicated by arrow V is shown in FIG. 1, the coloring matters 16R, 16G and 16B of each color of red, green and blue remain as they are between respective banks 12. Then, the active regions A of the glass substrate 10 are cut off, whereby the production of six pieces of striped color filters is completed.

In addition, although the banks 12 are formed in a striped pattern according to the above-mentioned embodiment, it is preferable that, as shown in a partially enlarged plan view of FIG. 10 in a similar manner to FIG. 5, the banks 26 are formed in a grid pattern, and the coloring matters 16R, 16G and 16B of each color of red, green and blue are applied into each of micro-concave parts 28 surrounded by the grid-shaped banks 26. In this modification, since the coloring matters are continuously discharged from the nozzles 14 to be applied linearly onto the glass substrate 10 in the application process of coloring matters, the coloring matters are also applied and adhered to the surface of the banks 26 in the active region A of the glass substrate 10. Even in such a modification, the coloring matters having been applied onto the surface of the bank 26 are shield from light with the banks 26 having light-blocking property, so that they are not exposed to light and remain uncured. Accordingly, in the development process, the coloring matters having been applied onto the surface of the banks 26 are dissolved and removed along with the uncured coloring matters having been applied to the non-active region B of the glass substrate 10, so that there is no problem at all.

Figure 12:
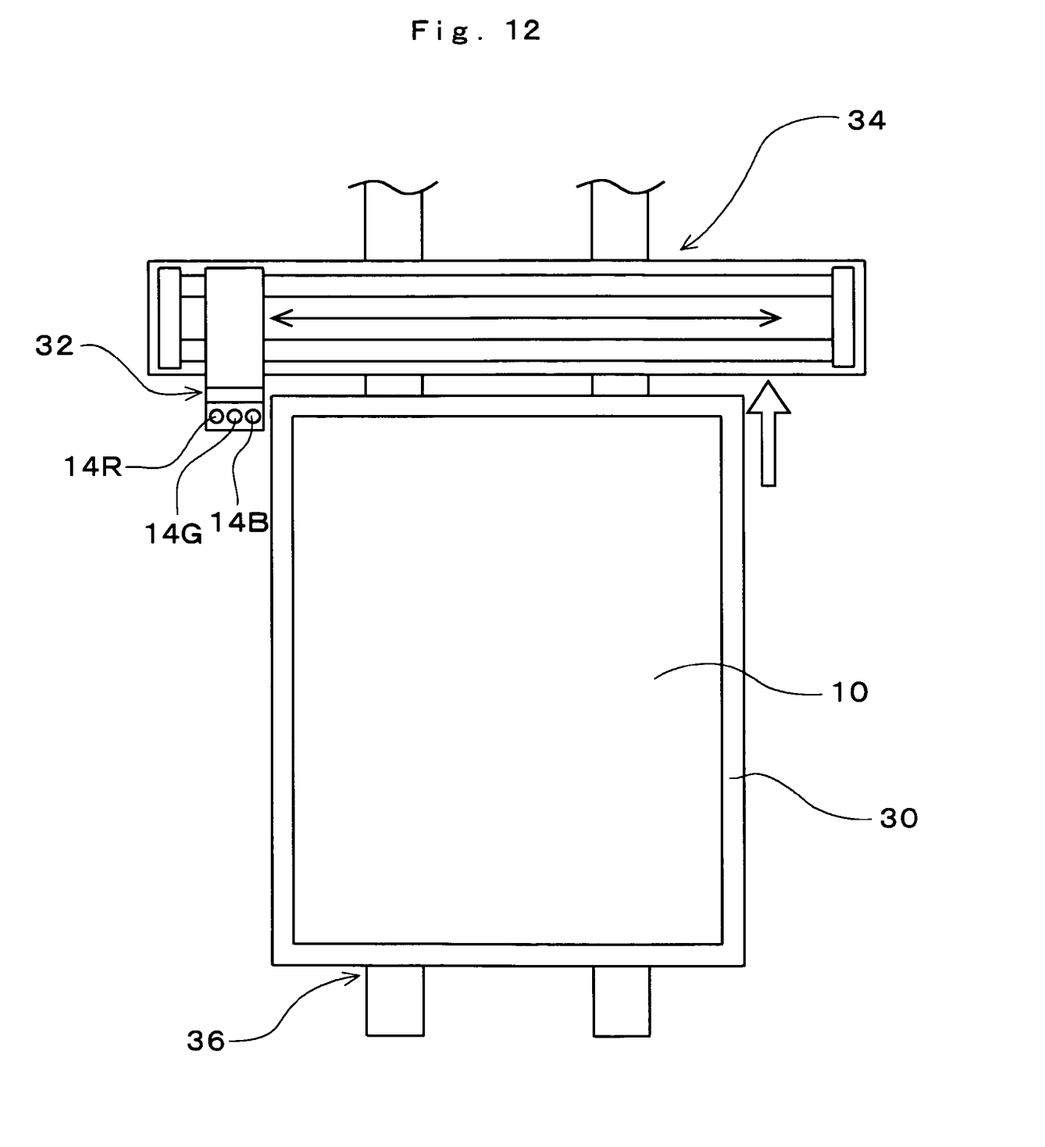
FIG. 12 is a schematic plan view showing one example of the construction of a coloring matter applicator for use in carrying out the manufacturing method of a color filter according to the invention.
Figure 13:
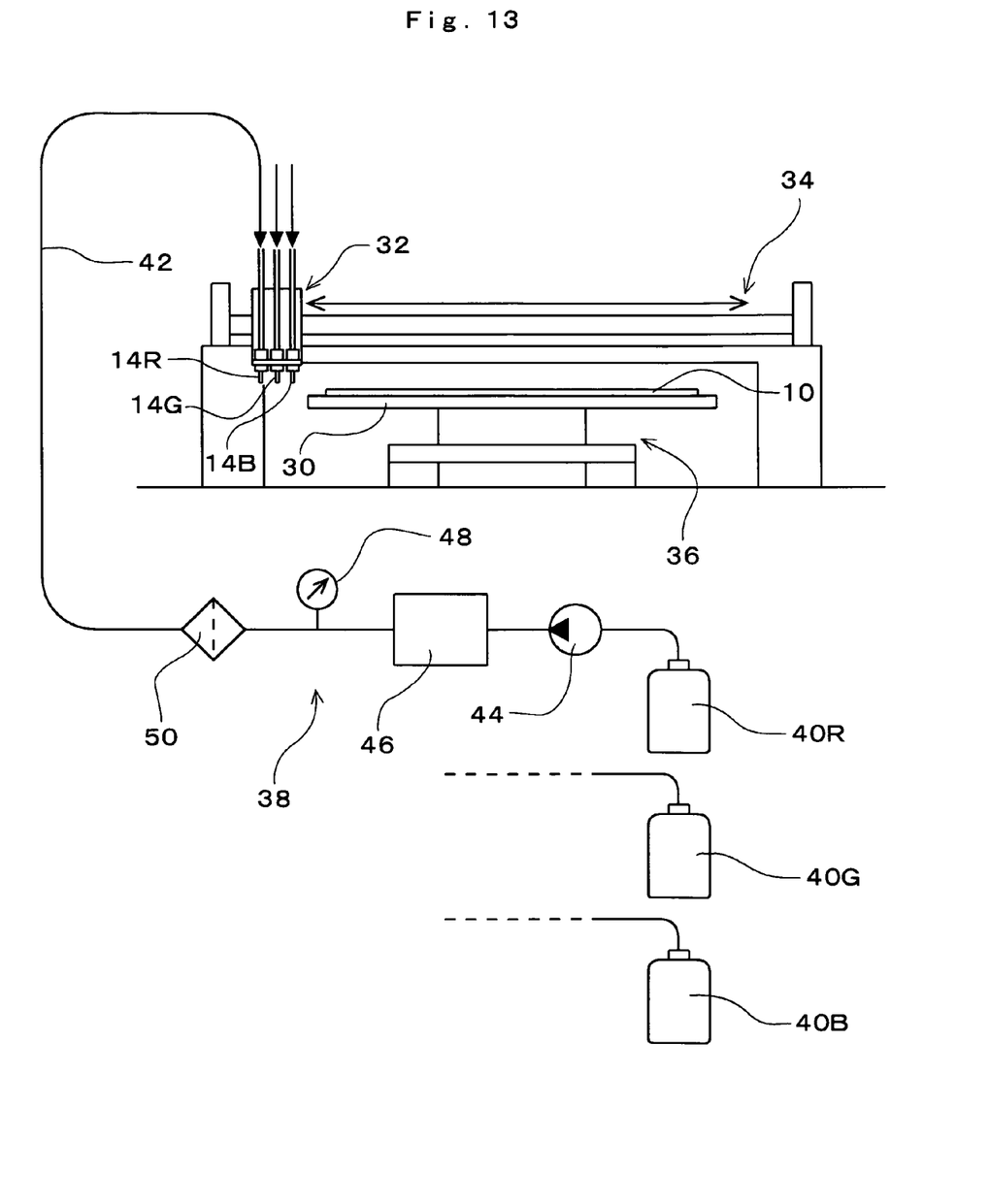
FIG. 13 is a schematic front view of the coloring matter applicator shown in FIG. 12, and shows a pipeline together.

Now, one example of the specific construction of a coloring matter applicator for use in the above-mentioned application process of coloring matters is described with reference to FIGS. 12 and 13. FIG. 12 is a schematic plan view of a coloring matter applicator, and FIG. 13 is a schematic front view of this apparatus showing a pipeline together.

This apparatus comprises a stage 30 holding a glass substrate 10 on which surface banks 12 are formed; a nozzle unit 32 holding three nozzles 14R, 14G and 14B that continuously discharge coloring matters of each color of red, green and blue; a nozzle scanning mechanism 34 causing this nozzle unit 32 to scan with respect to the glass substrate held on the stage 30; an intermittent feed mechanism causing the stage 30 to move intermittently at a predetermined pitch in a direction orthogonal to the scanning direction of the nozzle unit 32 with respect to the nozzle scanning mechanism 34; an alignment mechanism (not shown) making the glass substrate 10 aligned with respect to the stage 30; and the like. The nozzles 14R, 14G and 14B of the nozzle unit 32 are connected to respective coloring matter supply systems 38 (only the coloring matter supply system 38 of red is shown in FIG. 13, and showing the supply systems of coloring matters of each color of green and blue are omitted herein). The coloring matter supply systems 38 are formed of coloring matter reservoirs 40R, 40G, 40B that store coloring matters; coloring matter supply pipes 42 that provide a channel connection between the coloring matter reservoirs 40R, 40G and 40B and the nozzles 14A, 14G and 14B; and constant pressure pumps 44, mass-flow meters 46, manometers 48 and filters 50 that are interposed on the way of the coloring matter supply pipes 42.

The nozzle scanning mechanism 34 causes the nozzle unit 32 to move in a reciprocating manner laterally at high speed, for example, 3 m/sec. The intermittent feed mechanism 36 intermittently feeds the stage 30 that holds the glass substrate 10 at a predetermined pitch every time the nozzle unit 32 makes one scanning from one end side to the other end side. The apparatus shown in the drawing is arranged such that first red color of coloring matter is applied in a striped pattern to the entire glass substrate 10, subsequently green color of coloring matter is applied in a striped pattern to the entire glass substrate 10 adjacent to the application part of the coloring matter of red color, and finally blue color of coloring matter is applied in a striped pattern to the entire glass substrate 10 adjacent to the application part of the coloring matter of green color. The intermittent mechanism 36 causes the stage 30 holding the glass substrate 10 to intermittently move by three lines of banks 12 and elongated grooves 18 every time the nozzle unit 32 makes one scanning from one end side to the other side.

In addition, it is preferable that three nozzles 14R, 14G and 14B are held at the nozzle unit 32 positioned at intervals of [width dimension of a bank 12+width dimension of the elongate groove 18] in a direction orthogonal to the scanning direction of the nozzle unit 32; and the stage 30 is made to move intermittently by three lines of banks 12 and elongated grooves 18 while coloring matters of each color of red, green and blue are continuously discharged in a synchronous manner from three nozzles 14R, 14G and 14B to make the synchronous application of respective colors of coloring matters of red, green and blue onto the glass substrate 10. In this manner, the location, the number, and the discharge manner of nozzles, or the pitch of intermittent feed of the stage 30 are not limited to the above-described example. It is also preferable that instead of causing the stage 30 to move intermittently at a predetermined pitch, the stage 30 is fixed, and nozzle unit 32 is made to move intermittently at a predetermined pitch in a direction orthogonal to the foregoing scanning direction.

Moreover, according to the above-mentioned embodiment, coloring matters are applied onto a glass substrate 10 provided with six active regions A. The invention is not limited to this embodiment. The method of the invention is applicable to a glass substrate provided with a plurality of active regions. Further, not being limited to glass substrate provided with a plurality of active regions, the method of the invention can be likewise applied to a glass substrate including one active region, and in which a non-active region is located therearound to obtain the same function and advantage as in the above-mentioned embodiment.

What is claimed is:

1. A manufacturing method of a color filter, in which coloring matters are applied onto a transparent substrate on which surface a predetermined pattern of light-blocking bank functioning as a black matrix is formed, the manufacturing method of a color filter comprising the steps of:

continuously discharging a coloring matter having photosensitivity from a nozzle to apply the coloring matter to between said light-blocking banks on the transparent substrate while, with a nozzle being scanned with respect to said transparent substrate, causing the transparent substrate and the nozzle to move intermittently at a predetermined pitch relatively in a direction orthogonal to said scanning direction;

aligning and superimposing a mask in which a light transmission part corresponding to an active region of a color filter is formed on the backside of said transparent substrate, and exposing said transparent substrate to light from the backside through said mask to cause a coloring matter having been applied at a part corresponding to an active region of the color filter to be cured; and developing the surface side of said transparent substrate to dissolve and remove the uncured coloring matter having been applied at a part corresponding to a non-active region of a color filter, and the uncured coloring matter having been applied onto said light-blocking bank.

2. The manufacturing method of a color filter according to claim 1, wherein at least a surface of said light-blocking bank has liquid-repellent properties with respect to the coloring matter.

* * * * *